（12）United States Patent
Goldberg et al.

(10) Patent No.: US 9,304,713 B2
(45) Date of Patent: Apr. 5, 2016

(54) STORAGE SYSTEM AND A METHOD FOR ALLOCATING DISK DRIVES TO REDUNDANCY ARRAY OF INDEPENDENT DISKS

(71) Applicants: Alexander Goldberg, Rehovot (IL); Cyril Plisko, Petah Tikvah (IL); Yariv Yaari, Kibuz Gvulot (IL); Erez Rosenthal, Atlit (IL)

(72) Inventors: Alexander Goldberg, Rehovot (IL); Cyril Plisko, Petah Tikvah (IL); Yariv Yaari, Kibuz Gvulot (IL); Erez Rosenthal, Atlit (IL)

(73) Assignee: INFINIDAT LTD., Herzliya (IL)

( * ) Notice: Subject to any disclaimer, the term of this patent is extended or adjusted under 35 U.S.C. 154(b) by 228 days.

(21) Appl. No.: 13/775,199

(22) Filed: Feb. 24, 2013

(65) Prior Publication Data

US 2014/0244927 A1    Aug. 28, 2014

(51) Int. Cl.
| | |
|---|---|
| *G06F 12/00* | (2006.01) |
| *G06F 3/06* | (2006.01) |
| *G06F 12/02* | (2006.01) |
| *G06F 11/10* | (2006.01) |

(52) U.S. Cl.
CPC ............... *G06F 3/0689* (2013.01); *G06F 3/06* (2013.01); *G06F 3/061* (2013.01); *G06F 3/0611* (2013.01); *G06F 3/0614* (2013.01); *G06F 3/0619* (2013.01); *G06F 3/0632* (2013.01); *G06F 3/0646* (2013.01); *G06F 12/02* (2013.01); *G06F 11/1092* (2013.01)

(58) Field of Classification Search
CPC ......... G06F 3/06; G06F 3/061; G06F 3/0611; G06F 3/0614; G06F 3/0619; G06F 3/0646; G06F 3/0689; G06F 12/02
See application file for complete search history.

(56) References Cited

U.S. PATENT DOCUMENTS

| 8,429,346 B1* | 4/2013 | Chen et al. ................... 711/114 |
| 2010/0138682 A1* | 6/2010 | Obana et al. .................. 713/340 |

* cited by examiner

*Primary Examiner* — Shawn X Gu
(74) *Attorney, Agent, or Firm* — Reches Patents

(57) ABSTRACT

A storage system that may include a management module; and multiple disk drives; wherein the management module is arranged to allocate disk drives of the multiple disk drives to disk drive groups, each disk drive group corresponds to at least one redundancy array of independent disks (RAID) group of data in response to at least one out of: locations of the disk drives within disk drive enclosures; and expected or actual temperatures of the disk drives.

22 Claims, 8 Drawing Sheets

STORAGE SYSTEM AND A METHOD FOR ALLOCATING DISK DRIVES TO REDUNDANCY ARRAY OF INDEPENDENT DISKS

BACKGROUND

A disk storage or disc storage is a general category of storage mechanisms, in which data are digitally recorded by various electronic, magnetic, optical, or mechanical methods on a surface layer deposited of one or more planar, round and rotating disks (or discs) (also referred to as the media). A disk drive is a device implementing such a storage mechanism with fixed or removable media; with removable media the device is usually distinguished from the media as in compact disc drive and the compact disc. Notable types are the hard disk drives (HDD) containing a non-removable disk, the floppy disk drive (FDD) and its removable floppy disk, and various optical disc drives and associated optical disc media (www.wikipedia.org).

RAID (redundant array of independent disks) is a storage technology that combines multiple disk drive components into a logical unit. Data is distributed across the drives in one of several ways called "RAID levels", depending on the level of redundancy and performance required (www.wikipedia.org).

RAID is used as an umbrella term for computer data storage schemes that can divide and replicate data among multiple physical drives: RAID is an example of storage virtualization and the array can be accessed by the operating system as one single drive.

The different schemes or architectures are named by the word RAID followed by a number (e.g., RAID 0, RAID 1, RAID 2, RAID 3, RAID 4, RAID 5, RAID 6 and RAID 10). Each scheme provides a different balance between the key goals: reliability and availability, performance and capacity. RAID levels greater than RAID 0 provide protection against unrecoverable (sector) read errors, as well as whole disk failure.

A number of standard schemes have evolved which are referred to as levels. There were five RAID levels originally conceived, but many more variations have evolved, notably several nested levels and many non-standard levels (mostly proprietary). RAID levels and their associated data formats are standardized by the Storage Networking Industry Association (SNIA) in the Common RAID Disk Drive Format (DDF) standard.

RAID 5, 6 and 10 levels are commonly used in the industry.

RAID 5 (block-level striping with distributed parity) distributes parity along with the data and requires all drives but one to be present to operate. The array is not destroyed by a single drive failure. Upon drive failure, any subsequent reads can be calculated from the distributed parity such that the drive failure is masked from the end user. RAID 5 requires at least three disks.

RAID 6 (block-level striping with double distributed parity) provides fault tolerance up to two failed drives. This makes larger RAID groups more practical, especially for high-availability systems. This becomes increasingly important as large-capacity drives lengthen the time needed to recover from the failure of a single drive. Like RAID 5, a single drive failure results in reduced performance of the entire array until the failed drive has been replaced and the associated data rebuilt.

In RAID 10 (often referred to as RAID 1+0) (mirroring and striping), data are written in stripes across primary disks that have been mirrored to the secondary disks.

Modern storage systems may include large numbers of disk drives. There is a growing need to provide reliable and efficient storage systems.

SUMMARY

According to an embodiment of the invention various methods may be provided and are described in the specification. According to various embodiments of the invention there may be provided a non-transitory computer readable medium that may store instructions for performing any of the methods described in the specification and any steps thereof, including any combinations of same. Additional embodiments of the invention include a storage system arranged to execute any or all of the methods described in the specification above, including any stages—and any combinations of same.

According to an embodiment of the invention there may be provided a storage system that may include a management module; and multiple disk drives; wherein the management module is arranged to allocate disk drives of the multiple disk drives to disk drive groups, each disk drive group corresponds to at least one redundancy array of independent disks (RAID) group of data, in response to at least one out of: locations of the disk drives within disk drive enclosures; and expected or actual temperatures of the disk drives. A disk drive group of disk drives may correspond to a RAID group in the sense that data units and parity units of a RAID group are written to disk drives of the disk drive group. The RAID group may be formed from multiple stripes, each stripe may include data units and parity units that are dependently related by parity computational relations. Each stripe may be written to disk drives of a disk drive group.

According to another embodiment of the invention the storage system is arranged to allocate, for each RAID group out of multiple RAID groups, a group of addresses that are mapped to disk drives of a disk drive group. A portion of a RAID group (such as a stripe) is written to a part of the addresses of the group of addresses allocated to that RAID group. The allocation of groups of addresses to RAID groups may be responsive to at least one out of (a) locations of the disk drives within disk drive enclosures; and expected or actual temperatures of the disk drives. The addresses of the group of addresses may be physical or logical addresses. This allocation can allow a single disk drive to store data units that belong to multiple RAID groups. The number of RAID groups may differ than the number of disk drives of the storage system. For example, a system that includes three hundred disk drives may store much more than three hundred RAID groups (for example—it may store two thousand RAID groups).

The management module may be arranged to allocate the disk drives to disk drive groups in response to the expected or actual temperatures of the disk drives.

The disk drives are expected to be subjected to a non-uniform temperature distribution and wherein the management module may be arranged to allocate the disk drives to the disk drive groups in a manner that at least partially compensates for differences between expected disk drives failure rates resulting from the non-uniform temperature distribution.

The disk drives may form multiple classes of disk drives, wherein different classes of the disk drives are expected to be subjected to different temperature ranges.

The management module may be arranged to allocate the disk drives to the disk drive groups so that each disk drive group may include disk drives of different classes.

Each disk drive group is expected to withstand up to a predetermined number of concurrently failed disk drives; wherein the management module may be arranged to allocate to each disk drive group up to the predetermined number of disk drives of a hottest cluster of disk drives.

The storage system may include temperature sensors arranged to measure temperatures of the disk drives, wherein the management module may be arranged to allocate the disk drives to the disk drive groups in a manner that at least partially compensates for differences in measured temperatures of the disk drives.

The storage system may include multiple cooling outlets that may be arranged to direct cooling gas flows towards the disk drives; wherein the management module may be arranged to allocate the disk drives to disk drive groups based upon distances of the disk drives from the cooling outlets.

The cooling outlets may direct the cooling gas flows along horizontal paths.

The management module may be arranged to allocate the disk drives to the disk drive groups in response to the locations of the disk drives within disk drive enclosures and to the expected or actual temperatures of the disk drives.

The disk drives may form multiple sets that differ from each other by location, and wherein the management module may be arranged to allocate the disk drives to the disk drive groups so that each disk drive group may include disk drives of different sets. These sets may differ from disk drive groups.

The allocation module may be arranged to allocate the disk drives to disk drive groups based upon lengths of communication paths that are coupled to the disk drives.

The management module may be arranged to participate in a disk drive recovery process.

The management module may be arranged to allocate a spare disk to a disk drive group that may include a failed disk drive.

The management module may be arranged to select the spare disk drive in response to a relationship between expected or actual temperatures of the failed disk drive and of the spare disk drive.

The management module may be arranged to select the spare disk drive in response to a relationship between locations within disk drive enclosures of the failed disk drive and of the spare disk drive.

The management module may be arranged to change a RAID level of at least one disk drive group.

The management module may be arranged to reallocate the multiple disk drives to disk drive groups.

The storage system wherein the management module may be arranged to allocate disk drives of the multiple disk drives to disk drive groups such as to substantially equalize failure rates of different disk drive groups.

The management module may be arranged to allocate the disk drives to disk drive groups of a same level.

The management module may be arranged to allocate the disk drives to disk drive groups so that at least a first disk drive group of the disk drive groups has a different level than a second disk drive group of the disk drive groups. The first disk drive group may be of a higher level than the second disk drive group and wherein an expected average temperature of disk drives of the first disk drive group may include is higher than an expected average temperature of disk drives of the second disk drive group.

The management module may be arranged to allocate the disk drives to the disk drive groups in response to the locations within disk drive enclosures of the disk drives.

According to an embodiment of the invention there may be provided a method for allocating disk drives of a storage system that may include disk drives, the method may include allocating by a management module of the storage system, disk drives (all or a part of the multiple disk drives) to disk drive groups, each disk drive group corresponds to at least one redundancy array of independent disks (RAID) group of data in response to at least one out of: (a) locations within disk drive enclosures of the disk drives; and (b) expected or actual temperatures of the disk drives.

The method may include allocating, by the management module, the disk drives to disk drive groups in response to the expected or actual temperatures of the disk drives.

The disk drives are expected to be subjected to a non-uniform temperature distribution and the method may include allocating, by the management module, the disk drives to the disk drive groups in a manner that at least partially compensates for differences between expected disk drives failure rates resulting from the non-uniform temperature distribution.

The disk drives may form multiple classes of disk drives, wherein different classes of the disk drives are expected to be subjected to different temperature ranges. The method may include allocating the disk drives to the disk drive groups so that each disk drive group may include disk drives of different classes.

Each disk drive group may be expected to withstand up to a predetermined number of concurrently failed disk drives. The method may include allocating to each disk drive group up to the predetermined number of disk drives of a hottest cluster of disk drives.

The method may include measuring, by temperature sensors, temperatures of the disk drives, and allocating, by the management module, the disk drives to the disk drive groups in a manner that at least partially compensates for differences in measured temperatures of the disk drives.

The method may include directing, by multiple cooling outlets, cooling gas flows towards the disk drives; and allocating, by the management module, the disk drives to disk drive groups based upon distances of the disk drive from the cooling outlets.

The method may include directing, by the cooling outlets, the cooling gas flows along horizontal paths.

The method may include allocating, by the management module, the disk drives to the disk drive groups in response to locations of the disk drives within disk drive enclosures and to the expected or actual temperatures of the disk drives.

The disk drives may be arranged in multiple sets that differ from each other by location. The method may include allocating, by the management module, the disk drives to the disk drive groups so that each disk drive group may include disk drives of different sets. The sets may differ from disk drive groups.

The method may include allocating the disk drives to disk drive groups based upon lengths of communication paths that are coupled to the disk drives.

The method may include participating, by the management module, in a disk drive recovery process.

The method may include allocating, by the management module, a spare disk to a disk drive group that may include a failed disk drive.

The method may include selecting the spare disk drive in response to a relationship between expected or actual temperatures of the failed disk drive and of the spare disk drive.

The method may include selecting the spare disk drive in response to a relationship between locations within disk drive enclosures of the failed disk drive and of the spare disk drive.

The method may include changing a RAID level of at least one disk drive group.

The method may include reallocating the multiple disk drives to disk drive groups.

The method may include allocating, by the management module, disk drives of the multiple disk drives to disk drive groups such as to substantially equalize failure rates of different disk drive groups.

The method may include allocating, by the management module, the disk drives to disk drive groups of a same level.

The method may include allocating, by the management module, the disk drives to disk drive groups so that at least a first disk drive group of the disk drive groups has a different level than a second disk drive group of the disk drive groups. The first disk drive group is of a higher level than the second disk drive group and an expected average temperature of disk drives of the first disk drive group may include is higher than an expected average temperature of disk drives of the second disk drive group.

The method may include allocating the disk drives to the disk drive groups in response to the locations within disk drive enclosures of the disk drives.

According to an embodiment of the invention there may be provided a non-transitory computer readable medium that stores instructions that may cause a computerized system (such as a management module) allocate disk drives of the multiple disk drives to disk drive groups, each disk drive group corresponds to at least one redundancy array of independent disks (RAID) group of data in response to at least one out of: locations within disk drive enclosures of the disk drives; and expected or actual temperatures of the disk drives.

According to an embodiment of the invention there may be provided a method for storing data units, the method may include receiving or determining an allocation of disk drives of the multiple disk drives to disk drive groups, each disk drive group corresponds to at least one redundancy array of independent disks (RAID) group of data, wherein the allocation of disk drives to disk drive groups is responsive to at least one out of (a) locations within disk drive enclosures of the disk drives; and (b) expected or actual temperatures of the disk drives; receiving by a storage system, one or more write requests that include one or more data units to be written to the storage system; selecting a selected disk drive group that should store a RAID group, the RAID group includes members such as the one or more data units and at least one parity section; processing, by a data processor of the storage system, the data units to provide the RAID group; and writing the RAID group to the selected disk drive group.

According to an embodiment of the invention there may be provided a storage system that may include a management module and disk drives; wherein the management module may be arranged to receive or determine an allocation of disk drives of the multiple disk drives to disk drive groups, each disk drive group corresponds to at least one redundancy array of independent disks (RAID) group of data, wherein the allocation of disk drives to disk drive groups is responsive to at least one out of (a) locations within disk drive enclosures of the disk drives; and (b) expected or actual temperatures of the disk drives; wherein the storage system may be arranged to receive one or more write requests that include one or more data units to be written to the storage system; wherein the management module is further arranged to: select a selected disk drive group that should store a RAID group, the RAID group includes the one or more data units and at least one parity section; process the data units to provide the RAID group; and control a writing the RAID group to the selected disk drive group.

According to an embodiment of the invention there is provided a storage system that may include a management module; and multiple disk drives. The management module may be arranged to allocate, to at least one portion of of each redundancy array of independent disks (RAID) group out of multiple RAID groups, a group of addresses that are mapped to a plurality of disk drives of the multiple disk drives, wherein the allocation is in response to at least one out of: (a) locations of the plurality of disk drives within disk drive enclosures; and (b) expected or actual temperatures of the plurality of disk drives.

The management module may be arranged to allocate the groups of addresses in response to the expected or actual temperatures of the plurality of disk drives.

The multiple disk drives may be expected to be subjected to a non-uniform temperature distribution and wherein the management module may be arranged to allocate the groups of addresses in a manner that at least partially compensates for differences between expected disk drives failure rates resulting from the non-uniform temperature distribution.

The multiple disk drives form multiple classes of disk drives, wherein different classes of the disk drives are expected to be subjected to different temperature ranges; and wherein the management module may be arranged to allocate the groups of addresses so that each group of addresses is mapped to disk drives of different classes.

Each RAID group may be expected to withstand up to a predetermined number of concurrently failed disk drives; wherein the management module may be arranged to allocate to each group of addresses up to the predetermined number of addresses that are mapped to disk drives of a hottest class of disk drives.

The management module may be arranged to allocate the groups of addresses in response to the locations of the plurality of disk drives within disk drive enclosures and to the expected or actual temperatures of the plurality of disk drives.

The multiple disk drives are arranged in multiple sets that differ from each other by location, and wherein the management module may be arranged to allocate the groups of addresses so that each group of addresses is mapped to disk drives of different sets.

The allocation module may be arranged to allocate the groups of addresses based upon lengths of communication paths that are coupled to the multiple disk drives.

The management module may be arranged to participate in a disk drive recovery process.

According to an embodiment of the invention there is provided a method that may include allocating, to at least one portion of each redundancy array of independent disks (RAID) group out of multiple RAID groups, a group of addresses that are mapped to a plurality of disk drives of the multiple disk drives, wherein the allocating is responsive to at least one out of: (a) locations of the plurality of disk drives within disk drive enclosures; and (b) expected or actual temperatures of the plurality of disk drives.

According to an embodiment of the invention there is provided a non-transitory computer readable medium that stores instructions for allocating, to at least one portion of each redundancy array of independent disks (RAID) group out of multiple RAID groups, a group of addresses that are mapped to a plurality of disk drives of the multiple disk drives, wherein the allocating is responsive to at least one out of: (a) locations of the plurality of disk drives within disk drive enclosures; and (b) expected or actual temperatures of the plurality of disk drives.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
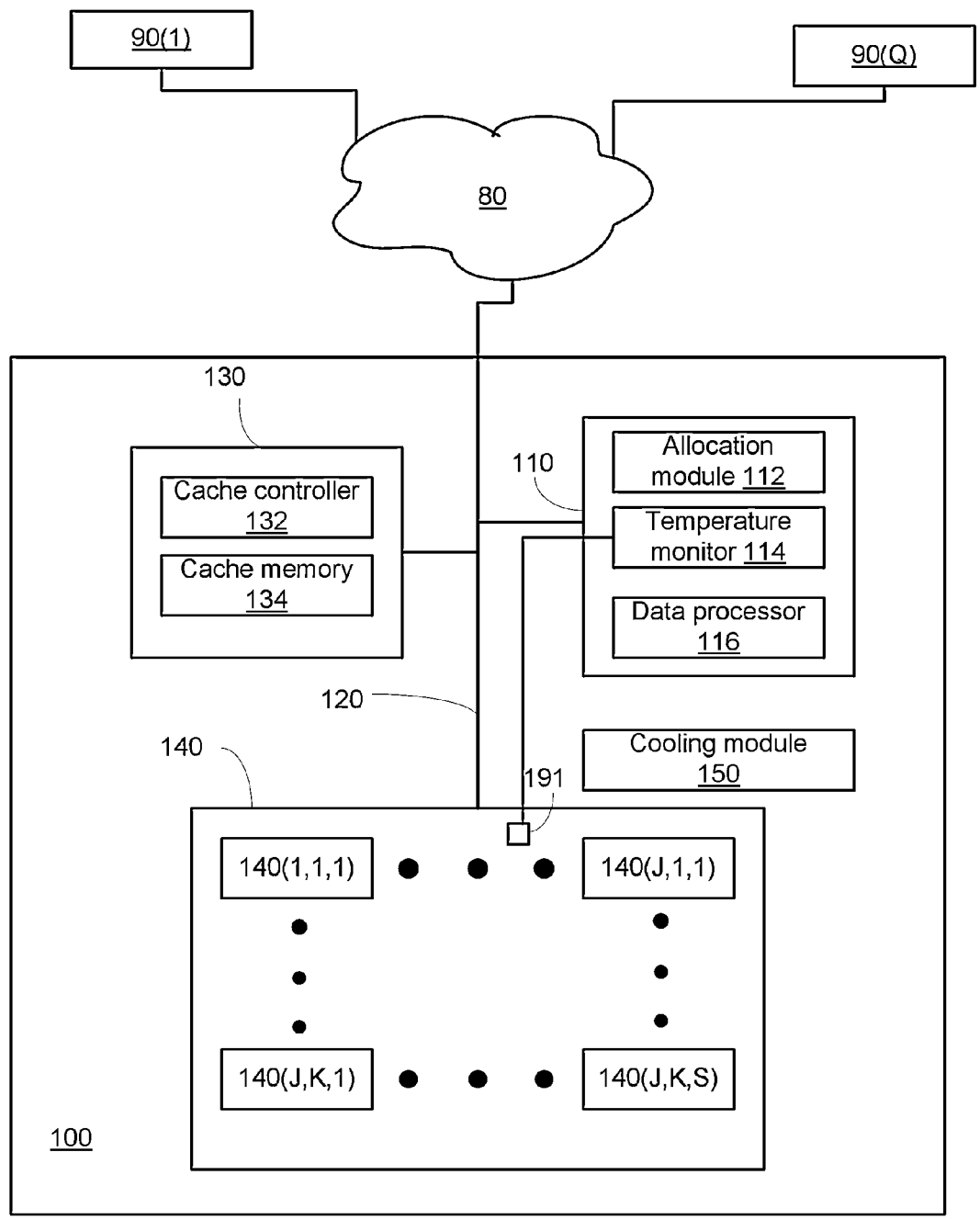
FIG. 1 illustrates storage system and its environment according to an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE DRAWINGS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

According to an embodiment of the invention there are provided storage systems and methods for allocating disk drives to disk drive groups based upon the location of the disk drives within the storage system and, additionally or alternatively based upon the actual or expected temperatures of the disk drives.

According to an embodiment of the invention a disk drive group may correspond to a RAID group in the sense that data units and parity units of a RAID group are written to disk drives of the disk drive group. The RAID group may be formed from multiple stripes, each stripe may include data units and parity units that are dependently related by parity computational relations. Each stripe may be written across disk drives of a disk drive group.

Actual temperatures may include temperatures measured at one or more points in time in one or more locations within disk drive enclosures among the disk drives. Expected temperatures can refer to temperatures that the disk drives are expected to reach at one of more point in time. For example, the expected temperature may refer to the temperature of the disk drive during normal operation, after a wake-up period or at any point in time. The actual or expected temperatures may be average temperatures, maximal temperatures, or represent an outcome of statistical or non-statistical processing of temperature information.

It has been found that a robust storage system may be provided if disk drives are allocated to disk groups (configured for accommodating RAID groups) in response to their locations—spreading disk drives that belong to the same enclosure and/or share the same electrical boards and/or connectors among different disk drive groups increases the overall reliability of the storage system. Disk drives that exchange signals over longer paths are expected to be subjected to more errors. Accordingly, the distance of disk drives from internal networks connectors should also be taken into account and the disk drive groups should include disk drives that are located at different distances from such connectors.

It has been found that disk drives within a storage system are subjected to an uneven distribution of temperatures within the storage system (different temperatures exist at the vicinity of different disk drives) due to uneven cooling of the different disk drives.

It is expected that warmer disk drives are less reliable than cooler disk drives. Accordingly, the allocation of disk drives to disk drive groups should take temperature related consideration into account. Disk drives that are expected to be warmer than others should be spread among disk drive groups.

FIG. 1 illustrates storage system 100 and its environment according to an embodiment of the invention.

Storage system 100 may be accessed by multiple computerized systems 90(1)-90(Q) that are coupled to storage system 100 over network 80. The computerized systems 90(1)-90(Q) can read data from the storage system 100 and/or write data to the storage system 100.

The storage system 100 includes a management module 110, internal network 120, cache module 130, cooling module 150 and multiple disk drives 140(1,1,1)-140(J,K,S). The multiple disk drives are collectively denoted 140. The disk drives include allocated disk drives that are allocated to disk drive groups and may include one or more spare disk drives. At any point of time a spare disk drive is a disk drive that is not allocated (at that point of time) to a disk drive group.

The management module 110 may include one or more processors and/or may be hosted by one or more processors. The management module may include at least one hardware component.

Indexes j, k and s range between 1 to J, 1 to K and 1 to S, respectively, and are used to differentiate between different disk drives. They may, for example, correspond to three dimensions of a three dimensional array formed by the disk drives 140.

The cache module 130 may include a cache controller 132 and a cache memory 134. The cache memory 134 can be used to temporarily store data received from computerized systems 90(1)-90(Q) before the data is destaged to disk drives 140.

Figure 2:
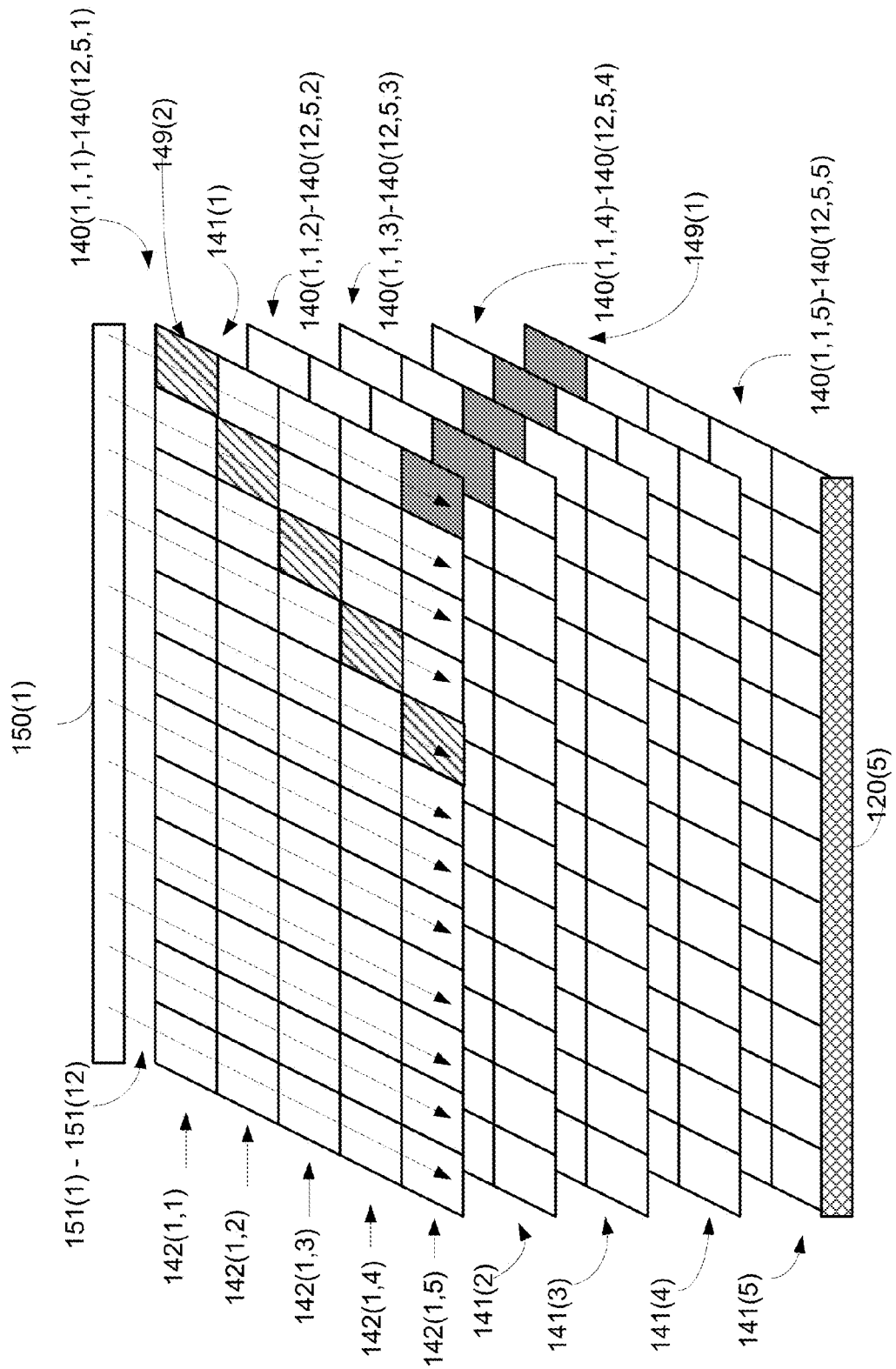
FIG. 2 illustrates a cooling outlet, multiple cooling gas flows and five sets of disk drives according to an embodiment of the invention.

The internal network 120 facilitates communications between the disk drives 140, the management module 110 and the cache module 130. The internal network 120 may include passive and active components such as communication links, connectors, switches, routers and the like. Referring for example to FIG. 2, a connector 120(5) is provided at the front end of a fifth set of disk drives (denoted 141(5)). Disk drives that are closer to the rear end of the fifth set can be expected to exchange signals over the internal network with higher signal to noise ratio and lower failure rate.

Figure 4:
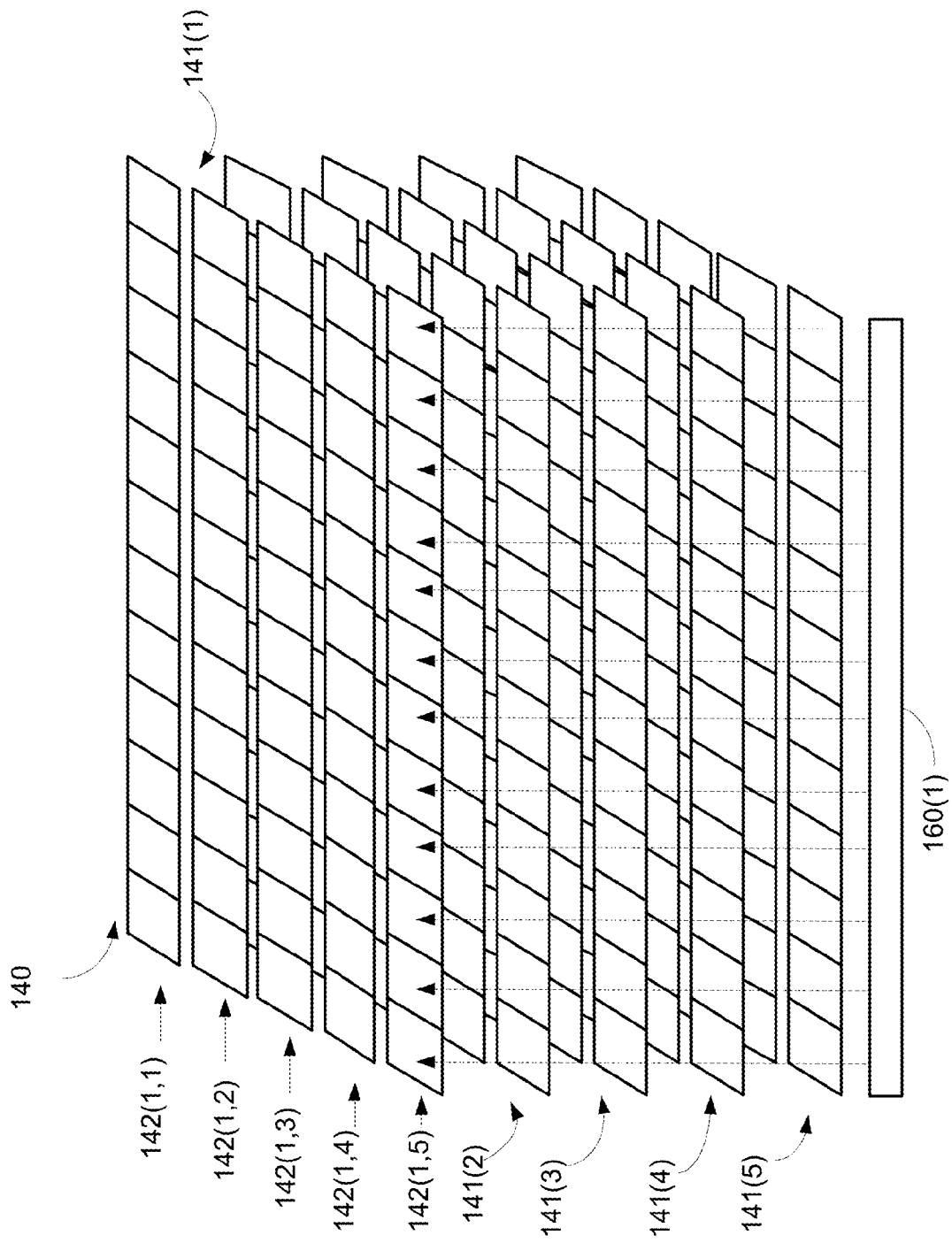
FIG. 4 illustrates a cooling outlet, multiple cooling gas flows and five sets of disk drives according to an embodiment of the invention.

The cooling module 150 is illustrated in FIGS. 2 and 4 as using gas to cool the disk drives. It is noted that it may, additionally or alternatively, use fluid to cool the disk drives. For brevity of explanation the following examples refer to gas base cooling.

The management module 110 controls the storage system 100. It may include an allocation module 112 for allocating disk drives to disk drive groups, one or more monitors for monitoring the state of the storage system, such as temperature monitor 114, and data processor 116. Data processor 116 may be arranged to generate RAID groups from data units and rebuild lost data units from RAID groups. Data processor 116 can execute various stages of method 300 of FIG. 6.

The temperature monitor 114 can include one or more temperature sensors spread in various locations of the storage system 100 and may measure and monitor temperatures of disk drives located in various locations within storage system 100. A temperature sensor (such as temperature sensor 191 of FIG. 1) can be allocated per each disk drive, per multiple disk drives, may be distributed in an even manner within the storage system or in uneven manner within the storage system.

The monitoring of temperatures may include receiving temperature readings from temperature sensors, comparing them to allowable temperature range, detecting excessive (above the tolerable) temperatures, providing statistics about the temperatures of the disk drives over time and the like.

It is noted that temperature monitor 114 is optional and that the locations of the disk drives as well as the cooling scheme used to cool the storage system 100 can provide an estimate of the temperatures of the disk drives. Especially—disk drives that are closer to outlets of cooling gas are expected to be cooler than disk drives that are distant from the outlets of the cooling gas.

The allocation module 112 may be arranged to allocate all of the multiple disk drives 140 to disk drive groups but may also allocate only a part of the multiple disk drives to disk drive groups. The remaining (non-allocated) disk drives may include spare disk drives, failed disk drives and the like. In the following text, and for brevity of explanation only, it is assumed that all of the disk drives are allocated to disk drive groups.

The allocation module 112 may be arranged to allocate disk drives (of the multiple disk drives) to disk drive groups such as to substantially equalize failure rates of different disk drive groups.

The allocation to disk drive groups may include at least one out of: (a) allocating the disk drives to disk drive groups of a same RAID level, (b) allocating the disk drives to disk drive groups so that at least a first disk drive group of the disk drive groups has a different RAID level than a second disk drive group of the disk drive groups.

The first disk drive group may be of a higher RAID level than the second disk drive group (for example, the first disk drive group complies with RAID 6, while the second RAID complies with RAID 5) and the assignment of a higher RAID level to the first disk drive group can at least partially compensate for differences in the temperatures between the disk drives of the first and second disk drive groups.

It is noted that the allocation module 112 may change the allocation (re-allocate) of disk drives to disk drive groups, may change the level of one or more disk drive groups, may allocate a spare disk drive instead a failed disk drive to a disk drive group, may replace a disk drive group of a first RAID level by a disk drive group of another RAID level, may allocate disk drive groups of the same RAID level or of different RAID levels, and the like.

The timing of any re-allocation can be determined in a random manner, in a pseudo-random manner or in a predetermined manner or in response to an event such as a disk drive failure, an expected disk drive failure, a disk drive group failure, an expected disk drive group failure, an un-tolerable change in the temperature of one or more disk drives, internal network malfunctions or load, and the like.

Increasing a RAID level of a disk drive group is more time and resource consuming process than a replacement of one disk drive of a disk drive group by another and thus the former is expected to be executed more rarely than the latter.

Increasing a RAID level of a disk drive group may include retrieving the entire data stored in a disk drive group and processing the data to comply with the higher RAID level and writing it to a new array of disk drives. Such an increment can be used if, for example, the expected failure rate of disk drives increases and it may be beneficial to increase the protection level. Additionally or alternatively, data that should be stored in a higher protection level may be stored at a disk drive group of a higher RAID level.

The disk drives 140 are stored in different locations within the storage system 100 and may be cooled in various manners. Two examples of cooling schemes are illustrated in FIGS. 2, 3 and 4.

FIG. 2 illustrates a cooling outlet 150(1), multiple cooling gas flows 151(1)-151(12) and five sets 141(1)-141(5) of disk drives according to an embodiment of the invention. The cooling outlet 150(1) is located at the front end of the sets and directs gas flows towards the rear end of the sets.

Figure 3:
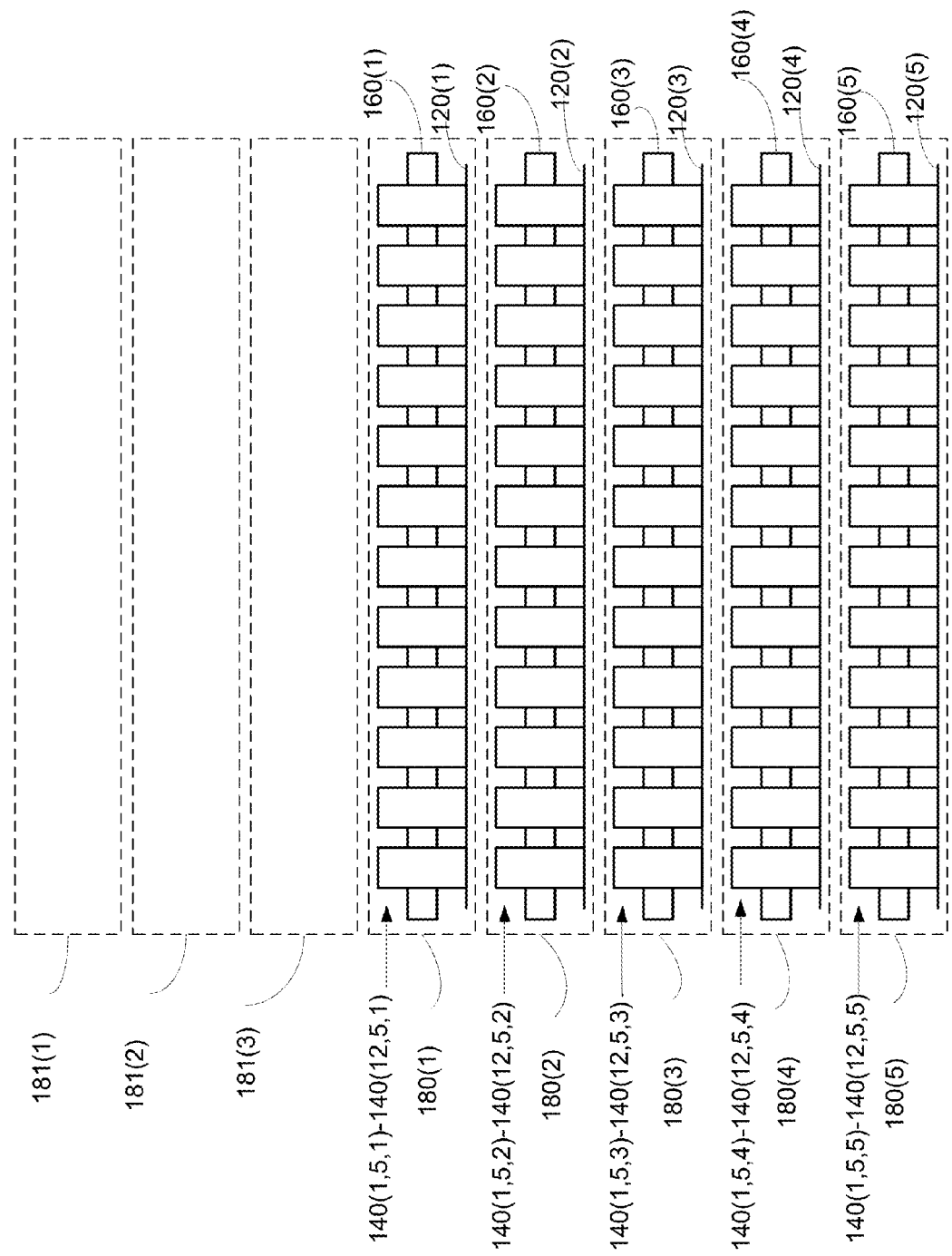
FIG. 3 is a front view of a portion of the storage system according to an embodiment of the invention.

FIG. 3 is a rear view of system 100 according to an embodiment of the invention.

First to fifth disk drive enclosures such as disk drawers 180(1)-180(5) include first to fifth sets of disk drives 141(1)-141(5) respectively and first to fifth electronic boards 120(1)-

120(5) that are coupled to the disk drives of each set. Each disk drawer (each set) is cooled by its own cooling outlet—so that first to fifth drawers 180(1)-180(5) are cooled respectively by first to fifth cooling outlets 160(1)-160(5).

Additional modules 181(1)-181(3) include management module 110, cache module 130 and may also include various components of the internal network 120 such as servers, switches, connectors and other components that couple the disk drives to the management module 110 and cache module 130.

It is noted that FIGS. 2 and 3 illustrate elongated cooling outlets and a single cooling outlet per drawer—but the number, shape, size and locations of the cooling outlets may differ from those illustrated in these figures.

Referring back to FIG. 2, each one of the five sets 141(1)-141(5) includes sixty disk drives—arranged in twelve columns and five rows.

The first set 141(1) includes disk drives 141(1, 1, 1)-140(12, 5, 1).

The second set 141(2) includes disk drives 141(1, 1, 2)-140(12, 5, 2).

The third set 141(3) includes disk drives 141(1, 1, 3)-140(12, 5, 3).

The fourth set 141(4) includes disk drives 141(1, 1, 4)-140(12, 5, 4).

The fifth set 141(5) includes disk drives 141(1, 1, 5)-140(12, 5, 5).

The sets 141(1)-141(5) are parallel to each other whereas set 141(1) is the highest set and set 141(5) is the lowest set.

The sets 141(1)-141(5) are spaced apart from each other and the disk drives of each set are spaced apart from each other to facilitate the cooling gas to flow between the different disk drives and different sets. It is noted that the disk drives of the same set may be very proximate to each other and that the different sets may be relatively close to each other—in order to reduce the overall size of the storage system 100. The relative distances between disk drives can provide a trade-off between cooling efficiency (which may require larger distances) and overall size of the storage system (which may require smaller distances).

The first row 142(1,1) of the first set 141(1) is the closest row (out of the rows of the first set) to the cooling gas opening 150(1) and is expected to be the coolest row of the first set 141(1). The same applies to the first rows of all of the other sets 141(2)-141(5).

Accordingly—the disk drives may be classified to five classes (one class per row)—wherein different classes differ from each other by the expected temperatures. The coolest class may include the disk drives of the first rows of all the sets and the hottest class may include the disk drives of the fifth rows of all of the sets.

The first class includes disk drives 140(j,1,s), the second class includes disk drives 140(j,2,s), the third class includes disk drives 140(j,3,s), the fourth class includes disk drives 140(j,4,s) and the fifth class includes disk drives 140(j,5,s), wherein j ranges between one and twelve, and s ranges between one and five.

The allocation of disk drives to disk drive groups may include spreading the disk drives of each class among different disk drive groups so that each disk drive group includes disk drives from different classes. Especially, spreading the disk drives of the hottest class between different disk drive groups. Each disk drive group may include a single member of each class (or an equal share of each class). Especially, the disk drive group may include only a single disk drive of the hottest class. Alternatively, the maximal number of disk drives from the hottest class can equal the number of disk drives failures the disk drive group can recover from (for example a disk drive group that complies with RAID 6 protection level may tolerate 2 concurrent drive failures and thus this disk drive group can include up to two disk drives of the hottest class).

While FIGS. 2 and 3 illustrate a horizontal cooling scheme, FIG. 4 illustrates a vertical cooling scheme according to an embodiment of the invention.

While in FIG. 2 the cooling gas follows substantially horizontal paths, FIG. 4 illustrates cooling gas that follows substantially vertical paths. The difference in the paths results in a difference in the classifying of the disk drives into classes and in a difference in an allocation of disk drives to disk drive groups. Thus, instead of having disk drive groups that include one disk drive (or even share of disk drives) from each row from each set of disk drives (FIG. 2), each disk drive group illustrated in FIG. 4 includes one disk drive (or even share of disk drives) from each single set.

For example, while the hottest class of disk drives of FIG. 2 includes the disk drives of the fifth row of all the sets, the hottest class of FIG. 4 includes all the disk drives of the first set 141(1).

The allocation module 112 may allocate disk drives to disk drive groups in response to the locations of the disk drives within disk drive enclosures and additionally or alternatively in response to expected or actual temperatures of the disk drives. The allocation may be responsive to the distance of the disk drives from communication connectors (such as connector 120(5) of FIG. 2).

In each location, expected temperature and actual temperature can impact the failure rates of the disk drives. The allocation of disk drives to disk drive groups should take at least part of this parameter into account.

The allocation of disk drives to disk drive groups may try to equalize the failure rates of different disk drive groups or at least try to find disk drive groups that will exhibit failure rates that are below a predetermined threshold or try to limit the number of disk drives with high failure probability (as expected from these drives' location) to the number of failures that the implemented RAID level can tolerate. Accordingly—disk drives that have higher (actual or expected) failure rates than others should be spread among the different disk drive groups.

It is noted that the allocation unit 112 may also consider additional parameters such as activity level of the disk drives, sequence number of the different disk drives, reliability, occupancy of the disk drive and the like.

According to various embodiments the allocation module 112 may perform the allocation of disk drives to disk drive groups by applying at least one of the following considerations:

A. Attempt to at least partially compensate for differences between expected disk drives failure rates resulting from a non-uniform temperature distribution to which the disk drives are subjected.
 B. Allocate disk drives to a disk drive group so that the disk drive group includes disk drives of different classes (each class is subjected to a different temperature range).
 C. Allocate the disk drives to the disk drive groups so that each disk drive group will include only a single disk drive of a hottest class of classes of disk drives.
 D. Allocate disk drives in response to actual temperatures measured in the storage system.
 E. Allocate the disk drives to the disk drive groups in a manner that at least partially compensates for differences in measured temperatures of the disk drives.

F. Allocate disk drives to disk drive groups based upon distances of the disk drive from the cooling outlets.
G. Allocate disk drives to disk drive groups based upon distances of the disk drive from communication connectors.
H. Allocate the disk drives to the disk drive groups in response to the locations of the disk drives within disk drive enclosures and to the expected or actual temperatures of the disk drives.
I. Allocate the disk drives to the disk drive groups so that each disk drive group comprises disk drives of different sets. The sets may differ from disk drive groups and maybe, for example, disk drives accommodated in enclosures or JBODs (just a bunch of disks).
J. Allocate the disk drives to disk drive groups in response to expected or actual activity levels of the disk drives.
K. Estimate expected temperatures of the disk drives at least partially in response to the activities of the disk drives.

Referring to the arrangement of FIG. 2, non-limiting examples of disk drive groups may include:
A. A disk drive group that includes a single disk drive per class (per row) and per column. FIG. 2 illustrates a non-limiting example of such a disk drive group—disk drive group 149(2) that includes disk drives 140(12,1,1), 140(11,2,1), 140(10,3,1), 140(9,4,1) and 140(8,5,1).
B. A disk drive group that includes a single disk drive per set, per class and per row.
C. A disk drive group that includes a single disk per class.
D. A disk drive group that includes a single disk per class and per set. FIG. 2 illustrates a non-limiting example of such a disk drive group—disk drive group 149(1) that includes disk drives 140(12,5,1), 140(12,4,2), 140(12,3,3), 140(12,2,4) and 140(12,1,5).
E. A disk drive group that includes a single disk drive from the hottest class (no matter from which set).
F. A disk drive group that includes a single disk drive from the hottest class and a single disk drive per set.
G. A disk drive group that includes a single disk drive from the hottest class and a single disk drive per row.

Each allocation of disk drives to disk drive groups may include more relevant parameters (for example—rows of sets of disk drives in FIG. 2) and less relevant parameters (for example—columns of sets of disk drives of FIG. 2). It is noted that once the more relevant parameters are selected the less relevant parameters may be selected in any manner such as random manner, pseudo-random manner, cyclic manner or any other predetermined manner.

It is noted that the allocation module 112 may receive or calculate relationships between a temperature of the disk drive and failure rate. This relationship can be provided by a third party (such as the vendor of the disk drive), can be calculated based upon history of previous disk drive failures and the like. The relationship can be calculated or received in any manner and may be updated over time. These relationships are taken into account when allocating the disk drives to disk drive groups. The same applied to receiving or calculating relationships between the locations of the disk drives within disk drive enclosures and the failure rate.

According to various embodiments of the invention the management module 110 may be arranged to participate in a disk drive recovery process. The disk drive recovery process may be triggered when a disk drive fails and may be aimed to compensate for this failure. Accordingly, the management module 110 may be arranged to perform at least one of the following stages:

A. Allocate a spare disk to a disk drive group that comprises a failed disk drive.
B. Select a spare disk drive to be allocated to a disk drive group (instead of a failed disk drive) in response to a relationship between (expected or actual) temperatures of the failed disk drive and of the spare disk drive. For example, the spare disk may belong to the same class (or a proximate class) as the failed disk, may be expected to be subjected to the same temperatures (or similar temperatures), and the like.
C. Select the spare disk drive in response to a relationship between locations within disk drive enclosures of the failed disk drive and of the spare disk drive. The failed disk drive and the spare disk drive may belong to the same set (or proximate set) as the failed disk or the failed disk drive and the spare disk drive may be located in a similar location within the disk enclosure, a similar location with regard to a distance from a communication connector or a similar location with regard to the cooling outlet.
D. Change a RAID level of at least one disk drive group—for example increase the RAID level to provide more reliable (but more size consuming) storage.

Figure 5:
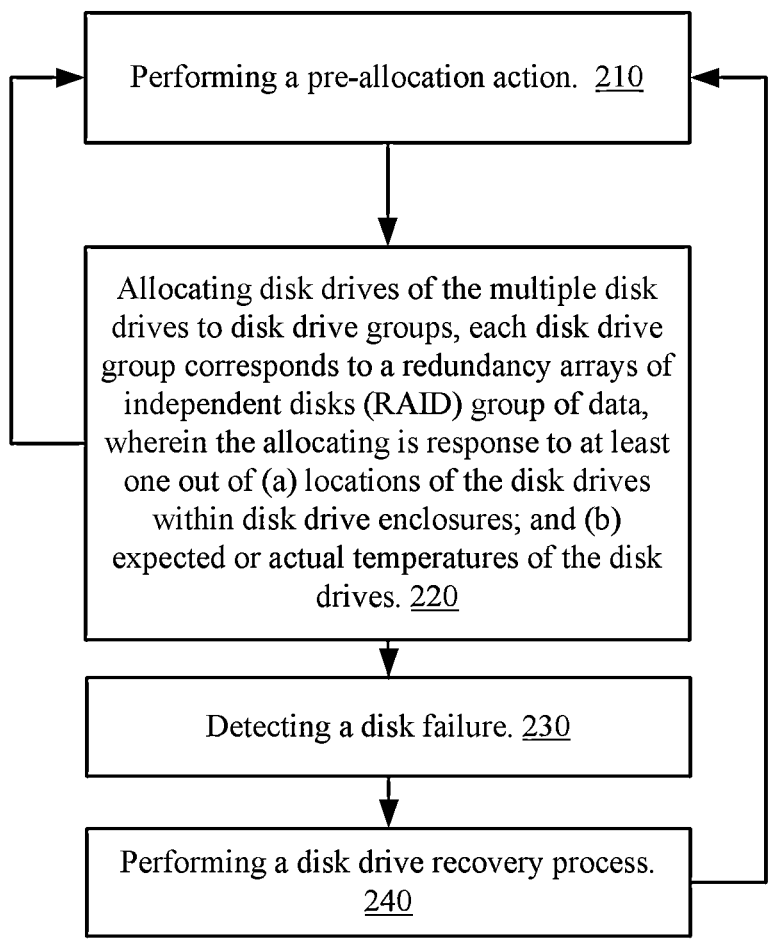
FIG. 5 illustrates a method according to an embodiment of the invention.

FIG. 5 illustrates a method 200 according to an embodiment of the invention.

Method 200 starts by stage 210 of performing a pre-allocation action.

The pre-allocation stage may precede stage 220 and may include determining to perform an allocation of disk drives to disk drive groups (the determining may be responsive to an event, preformed in a random, pseudo-random or predetermined manner), measuring one or more parameters such as temperatures and/or activities of disk drives, estimating expected temperatures of the disk drives.

Stage 210 may be followed by stage 220 of allocating by a management module of the storage system disk drives of the multiple disk drives to disk drive groups, each disk drive group corresponds to at least one redundancy array of independent disks (RAID) group, in response to at least one out of (a) locations of the disk drives within disk drive enclosures; and (b) expected or actual temperatures of the disk drives.

Stage 220 may include at least one of the following:
A. Allocating by the management module the disk drives to disk drive groups in response to the expected or actual temperatures of the disk drives.
B. Allocating by the management module the disk drives to the disk drive groups in a manner that at least partially compensates for differences between expected disk drives failure rates resulting from the non-uniform temperature distribution.
C. Allocating the disk drives to the disk drive groups in response to a virtual classifying of disk drives to classes, wherein different classes of the disk drives may be expected to be subjected to different temperature ranges.
D. Allocating the disk drives to the disk drive groups so that each disk drive group comprises disk drives of different classes.
E. Allocating the disk drives to the disk drive groups so that each disk drive group will include only a single disk drive of a class of disk drives that is expected to be subjected to a highest temperature range out of the different temperature ranges.
F. Allocating by the management module the disk drives to the disk drive groups in a manner that at least partially compensates for differences in measured temperatures of the disk drives.

G. Allocating by the management module the disk drives to disk drive groups based upon distances of the disk drive from the cooling outlets.

H. Allocating by the management module the disk drives to the disk drive groups in response to locations of the disk drives within disk drive enclosures and to the expected or actual temperatures of the disk drives.

I. Allocating the disk drives to the disk drive groups so that each disk drive group comprises disk drives of different sets.

J. Allocating by the management module the disk drives to disk drive groups of a same level.

K. Allocating by the management module the disk drives to disk drive groups so that at least a first disk drive group of the disk drive groups has a different level than a second disk drive group of the disk drive groups. The first disk drive group may be of a higher level than the second disk drive group and the expected average temperature of disk drives of the first disk drive group comprises is higher than an expected average temperature of disk drives of the second disk drive group.

L. Allocating the disk drives to the disk drive groups in response to the locations of the disk drives within disk drive enclosures.

M. Allocating by the management module disk drives of the multiple disk drives to disk drive groups such as to substantially equalize failure rates of different disk drive groups.

Stage 220 may be followed by stage 210. Accordingly—method 200 may include changing an allocation (reallocating) of disk drives to one or more disk drive groups.

Either one of stages 210 and 220 may be followed by stage 230 of detecting a disk failure. The detection of the disk failure may occur during the execution of either one of stage 210 and 220.

The detection of a disk failure may be followed by stage 240 of performing a disk drive recovery process. The disk drive recovery process may be executed, at least in part, by the management module.

Stage 240 may include at least one out of:
A. Allocating by the management module a spare disk to a disk drive group that includes the failed disk drive.
B. Selecting the spare disk drive in response to a relationship between expected or actual temperatures of the failed disk drive and of the spare disk drive.
C. Selecting the spare disk drive in response to a relationship between locations within disk drive enclosures of the failed disk drive and of the spare disk drive.
D. Changing a RAID level of at least one disk drive group.
E. Reallocating the multiple disk drives to disk drive groups.

Stage 240 may be followed by stage 210.

Figure 6:
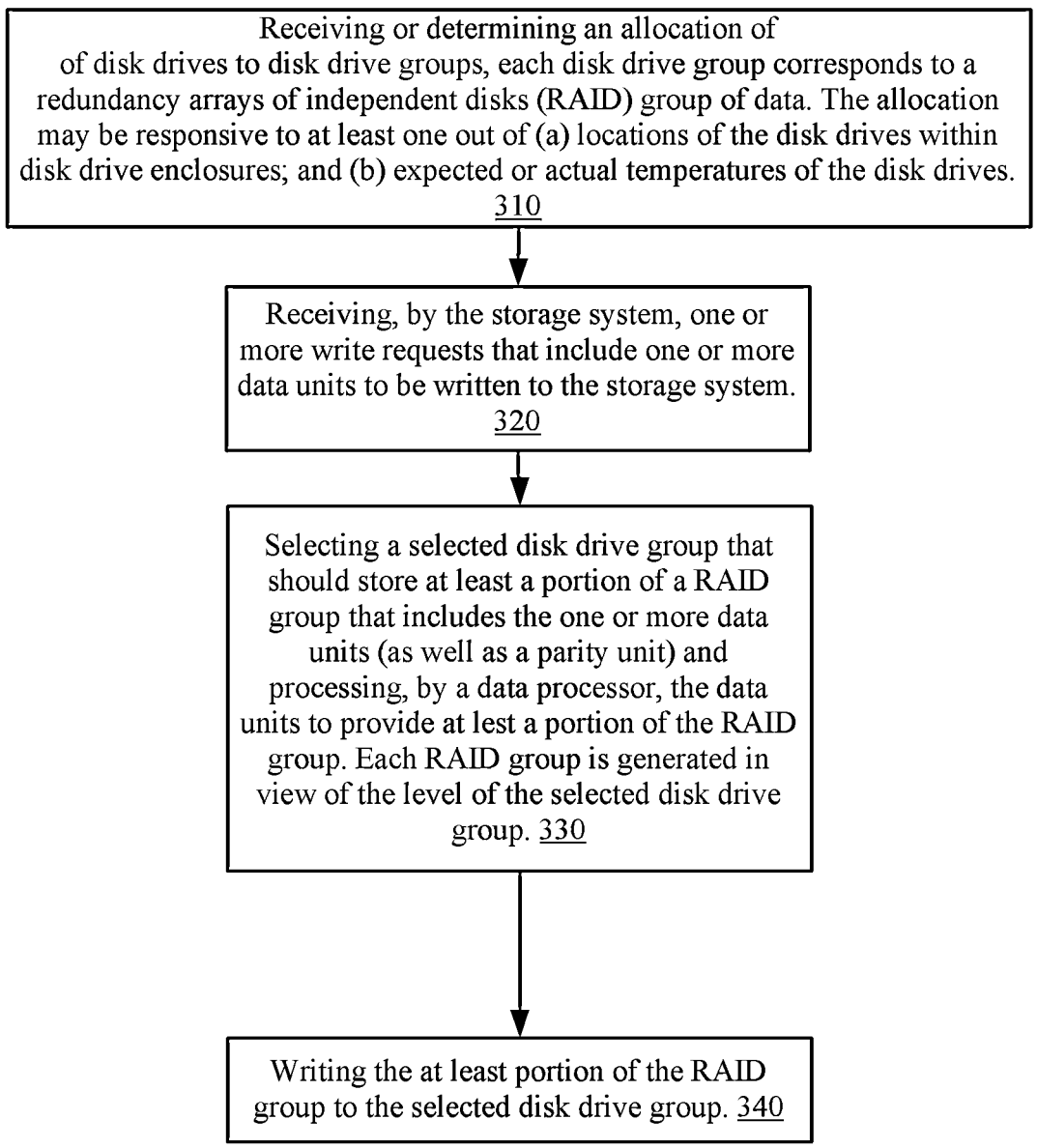
FIG. 6 illustrates a method according to an embodiment of the invention.

FIG. 6 illustrates method 300 according to an embodiment of the invention.

Method 300 may start by stage 310 of receiving or determining an allocation of disk drives to disk drive groups. The allocation may be responsive to at least one out of (a) locations of the disk drives within disk drive enclosures; and (b) expected or actual temperatures of the disk drives.

Stage 310 is followed by stage 320 of receiving, by the storage system, one or more write requests related to one or more data units to be written to the storage system.

Stage 320 is followed by stage 330 of selecting a selected disk drive group that should store at least a portion of a RAID group that includes the one or more data units (as well as a parity unit) and processing, by a data processor, the data units to provide at least a portion of the RAID group. The portion can include, for example, a stripe. Each RAID group is generated in view of the RAID level of the selected disk drive group. If, for example the selected disk drive group is RAID 6 compliant then the RAID group should also be RAID 6 compliant. The generation of RAID groups can be done in any manner known in the art. The selection of which disk drive group to select can be performed in view of any parameter known in the art including, for example, load balancing.

Stage 330 may be followed by stage 340 of writing the at least portion of the RAID group to the selected disk drive group.

Any combination of stages of method 200 and 300 can be executed by storage system 100.

According to another embodiment of the invention the storage system is arranged to allocate, for each RAID group out of multiple RAID groups, a group of addresses that are mapped to multiple disk drives of a disk drive group. A portion of a RAID group or the whole RAID group (such as a stripe) is written to at least part of the addresses of the group of addresses allocated to that RAID group. The allocation of groups of addresses to RAID groups may be responsive to at least one out of (a) locations of the disk drives within disk drive enclosures; and expected or actual temperatures of the disk drives. The addresses of the group of addresses may be physical or logical addresses. This allocation can allow a single disk drive to store data units that belong to multiple RAID groups. The number of RAID groups may differ from the number of disk drives of the storage system. For example, a system that includes three hundred disk drives may store much more than three hundred RAID groups (for example—it may store two thousand RAID groups).

Figure 7:
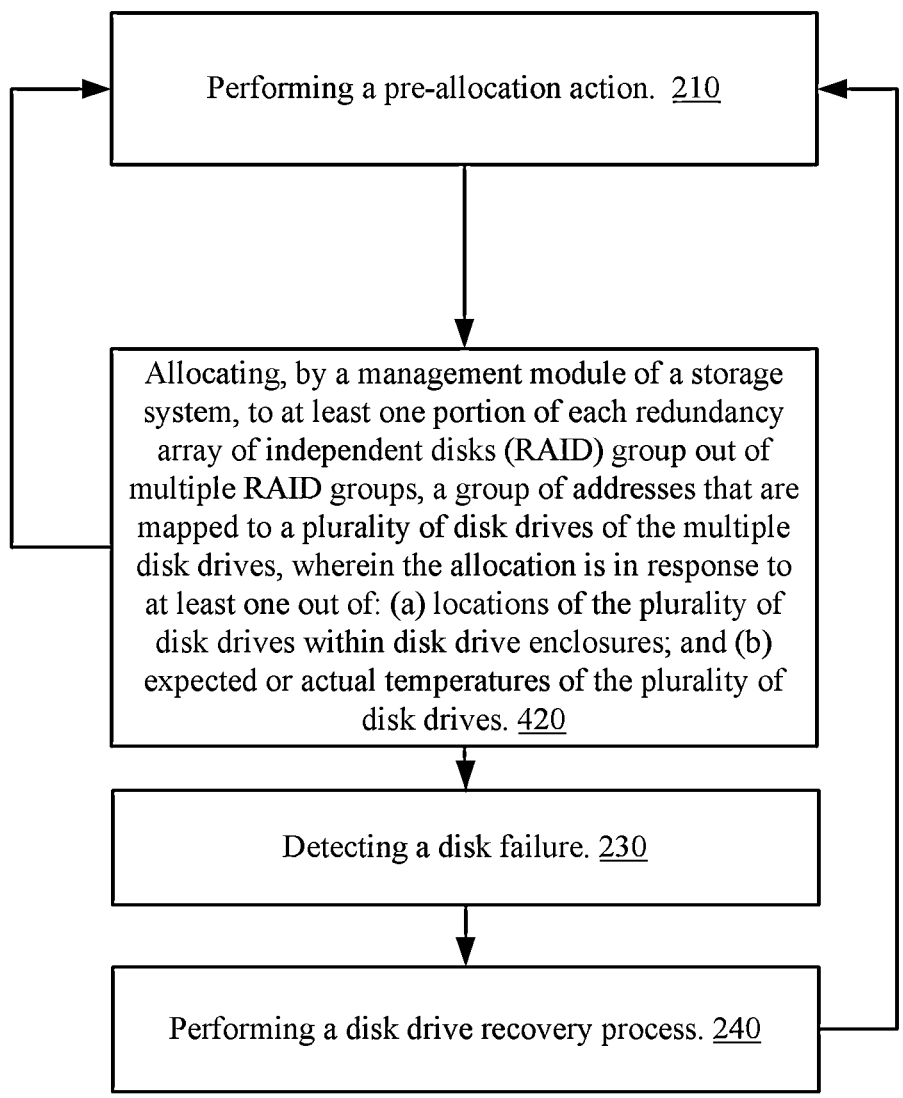
FIG. 7 illustrates a method according to an embodiment of the invention.

FIG. 7 illustrates method 400 according to an embodiment of the invention.

Method 400 differs from method 200 by including, instead of stage 220, stage 420.

Stage 420 may include allocating, by a management module of a storage system, to at least one portion of each redundancy array of independent disks (RAID) group out of multiple RAID groups, a group of addresses that are mapped to a plurality of disk drives of the multiple disk drives, wherein the allocation is in response to at least one out of: (a) locations of the plurality of disk drives within disk drive enclosures; and (b) expected or actual temperatures of the plurality of disk drives. The addresses may be physical addresses or logical addresses. The addresses may form continuous or non-continuous address spaces per disk drive and the like. The portions can be stripes but this is not necessarily so. The allocation can be made for each portion of the RAID group, may change per each portion of a RAID group, may be made per some portions of the RAID group, per time period, per event (such as failure), and the like. The allocation of stage 420 can be made for the entire RAID group.

Stage 420 may include allocating the groups of addresses in response to the expected or actual temperatures of the plurality of disk drives.

The multiple disk drives may be expected to be subjected to a non-uniform temperature distribution and stage 420 may include allocating the groups of addresses in a manner that at least partially compensates for differences between expected disk drives failure rates resulting from the non-uniform temperature distribution.

The multiple disk drives may form multiple classes of disk drives, wherein different classes of the disk drives are expected to be subjected to different temperature ranges. Stage 420 may include allocating the groups of addresses so that each group of addresses is mapped to disk drives of different classes.

Each RAID group may be expected to withstand up to a predetermined number of concurrently failed disk drives. Stage 420 may include allocating to each group of addresses up to the predetermined number of addresses that are mapped to disk drives of a hottest class of disk drives.

Stage 420 may include allocating the groups of addresses in response to the locations of the plurality of disk drives within disk drive enclosures and to the expected or actual temperatures of the plurality of disk drives.

The multiple disk drives may be arranged in multiple sets that differ from each other by location. Each set may be included in a different enclosure. Stage 420 may include allocating the groups of addresses so that each group of addresses is mapped to disk drives of different sets.

Stage 420 may include allocating the groups of addresses based upon lengths of communication paths that are coupled to the multiple disk drives.

Figure 8:
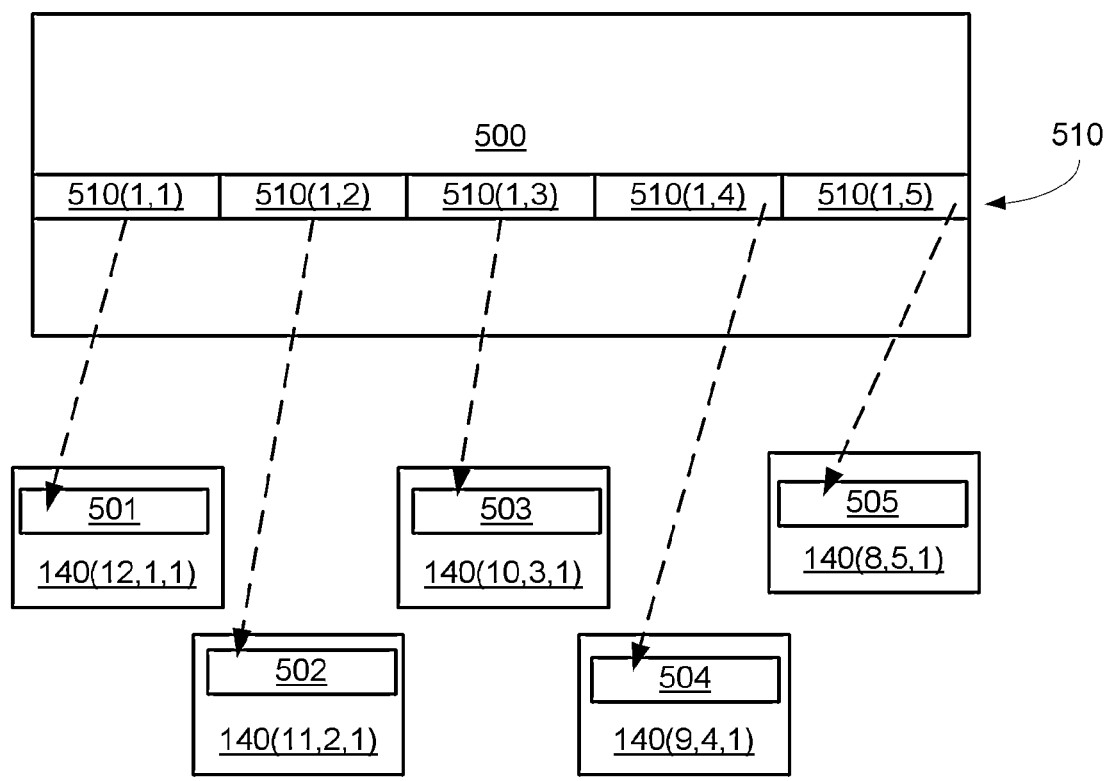
FIG. 8 illustrates a RAID group that includes multiples stripes according to an embodiment of the invention.

FIG. 8 illustrates a writing process of parts of a stripe of a RAID group 149(2) to addresses 501-505 allocated for storing the RAID group according to an embodiment of the invention.

FIG. 8 illustrates a RAID group 500 that includes multiples stripes such as stripe 510 that include multiple parts of data and of parity 510(1)-510(5) according to an embodiment of the invention.

Disk drive group 149(2) includes disk drives 140(12,1,1), 140(11,2,1), 140(10,3,1), 140(9,4,1) and 140(8,5,1). Address ranges 501-505 of disk drives 140(12,1,1), 140(11,2,1), 140 (10,3,1), 140(9,4,1) and 140(8,5,1) form the group of addresses that are allocated for storing stripe 510 of RAID group 500.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may cause the storage system to allocate disk drives to disk drive groups.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein may be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A storage system that comprises:
a management module; and
a plurality of disk drives;
wherein the management module is arranged to allocate disk drives of the plurality of disk drives to disk drive groups, each disk drive group corresponds to at least one redundancy array of independent disks (RAID) group of data, wherein the disk drives form multiple classes of disk drives, wherein different classes are associated with different ranges of expected physical temperatures; and wherein the management module is arranged to allocate the disk drives to the disk drive groups so that each disk drive group comprises disk drives of different classes.

2. The storage system according to claim 1, wherein the expected physical temperatures associated with the multiple classes of disk drives are determined in accordance with locations, within disk drive enclosures, of the disk drives that form the multiple classes of disk drives.

3. The storage system according to claim 1, wherein the disk drives are expected to be subjected to a non-uniform temperature distribution and wherein the management module is arranged to allocate the disk drives to the disk drive groups in a manner that at least partially compensates for differences between expected disk drives failure rates resulting from the non-uniform temperature distribution.

4. The storage system according to claim 1, wherein each disk drive group is expected to withstand up to a predetermined number of concurrently failed disk drives; wherein the management module is arranged to allocate to each disk drive group up to the predetermined number of disk drives of a hottest class of disk drives.

5. The storage system according to claim 1, wherein the management module is arranged to allocate the disk drives to the disk drive groups in response to the locations of the disk drives within disk drive enclosures and to the expected physical temperatures of the disk drives.

6. The storage system according to claim 5, wherein the disk drives are arranged in multiple sets that differ from each other by location, and wherein the management module is arranged to allocate the disk drives to the disk drive groups so that each disk drive group comprises disk drives of different sets.

7. The storage system according to claim 1, comprising multiple cooling outlets that are arranged to direct cooling flows towards the disk drives; wherein the management module is arranged to allocate the disk drives to disk drive groups based upon distances of the disk drives from the cooling outlets.

8. The storage system according to claim 1, wherein the allocation module is further arranged to allocate the disk drives to disk drive groups based upon lengths of communication paths that are coupled to the disk drives.

9. The storage system according to claim 1, wherein the management module is arranged to participate in a disk drive recovery process.

10. The storage system according to claim 1, wherein the management module is arranged to select a spare disk drive to replace a failed disk drive in response to a relationship between expected physical temperatures of the failed disk drive and of the spare disk drive.

11. The storage system according to claim 1, wherein the management module is arranged to allocate the disk drives to disk drive groups that correspond to RAID groups of a same level.

12. The storage system according to claim 1, wherein the management module is arranged to allocate disk drives to first and second disk drive groups that correspond to first and second RAID levels that differ from each other.

13. The storage system according to claim 12, wherein the first RAID level is higher than the second RAID level and wherein an expected average temperature of disk drives corresponding to the first RAID level is higher than an expected average temperature of disk drives corresponding to the second RAID level.

14. A method for allocating disk drives of a storage system that comprises a plurality of disk drives, the method comprising: allocating by a management module of the storage system, the disk drives of the plurality of disk drives to disk drive groups, each disk drive group corresponds to at least one redundancy array of independent disks (RAID) group of data, wherein the disk drives form multiple classes of disk drives, wherein different classes are associated with different ranges of expected physical temperatures; and wherein the allocating of the disk drives to the disk drive groups is performed so that each disk drive group comprises disk drives of different classes.

15. A storage system that comprises:
a management module; and
a plurality of disk drives;
wherein the management module is arranged to allocate to at least one portion of each redundancy array of independent disks (RAID) group out of multiple RAID groups, a group of addresses that are mapped to the plurality of disk drives, wherein the plurality of disk drives form multiple classes of disk drives, wherein different classes are associated with different ranges of expected physical temperatures; and wherein the management module is arranged to allocate the groups of addresses so that each group of addresses is mapped to disk drives of different classes.

16. The storage system according to claim 15, wherein the expected physical temperatures associated with the multiple classes of disk drives are determined in accordance with locations, within disk drive enclosures, of the disk drives that form the multiple classes of disk drives.

17. The storage system according to claim 15, wherein the disk drives are expected to be subjected to a non-uniform temperature distribution and wherein the management module is arranged to allocate the groups of addresses in a manner that at least partially compensates for differences between expected disk drives failure rates resulting from the non-uniform temperature distribution.

18. The storage system according to claim 15, wherein each RAID group is expected to withstand up to a predetermined number of concurrently failed disk drives; wherein the management module is arranged to allocate to each group of addresses up to the predetermined number of addresses that are mapped to disk drives of a hottest class of disk drives.

19. The storage system according to claim 15, wherein the management module is arranged to allocate the groups of addresses in response to the locations of the plurality of disk drives within disk drive enclosures and to the expected physical temperatures of the plurality of disk drives.

20. The storage system according to claim 15, wherein the disk drives are arranged in multiple sets that differ from each other by location, and wherein the management module is arranged to allocate the groups of addresses so that each group of addresses is mapped to disk drives of different sets.

21. The storage system according to claim 15, wherein the allocation module is further arranged to allocate the groups of addresses based upon lengths of communication paths that are coupled to the disk drives.

22. The storage system according to claim 15, wherein the management module is arranged to participate in a disk drive recovery process.

* * * * *